(No Model.) 2 Sheets—Sheet 1.

W. R. CLOSE.
AUTOMATIC REGULATING DEVICE FOR POWER TRANSMITTERS.

No. 368,570. Patented Aug. 23, 1887.

Witnesses: Inventor.

N. PETERS, Photo-Lithographer, Washington, D. C.

(No Model.) 2 Sheets—Sheet 2.

W. R. CLOSE.
AUTOMATIC REGULATING DEVICE FOR POWER TRANSMITTERS.

No. 368,570. Patented Aug. 23, 1887.

Witnesses:

Inventor.
Walter R. Close,
per
Percy W. J. Lander,
Attorney.

N. PETERS, Photo-Lithographer, Washington, D. C.

UNITED STATES PATENT OFFICE.

WALTER R. CLOSE, OF BANGOR, MAINE, ASSIGNOR OF ONE-FOURTH TO ADOLPHUS J. CHAPMAN, OF SAME PLACE.

AUTOMATIC REGULATING DEVICE FOR POWER-TRANSMITTERS.

SPECIFICATION forming part of Letters Patent No. 368,570, dated August 23, 1887.

Application filed April 19, 1887. Serial No. 235,406. (No model.)

*To all whom it may concern:*

Be it known that I, WALTER R. CLOSE, a citizen of the United States, residing at Bangor, in the county of Penobscot and State of Maine, have invented a new and useful Automatic Regulating Device for Power-Transmitters; and I do hereby declare that the following is a full, clear, and exact description of the invention, which will enable others skilled in the art to which it appertains to make and use the same.

My invention relates to an improved automatic regulating device for power-transmitters.

It is especially adapted for operating fog-signals, and is illustrated in the accompanying drawings, in which its application to fog-signals is incidentally shown, and in which—

Figure 1:
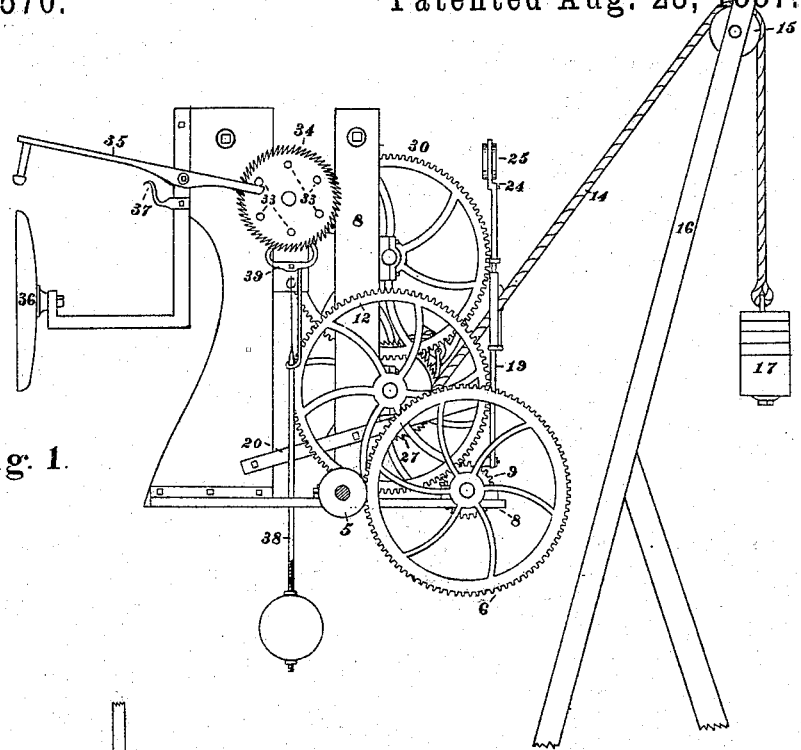
Figure 2:
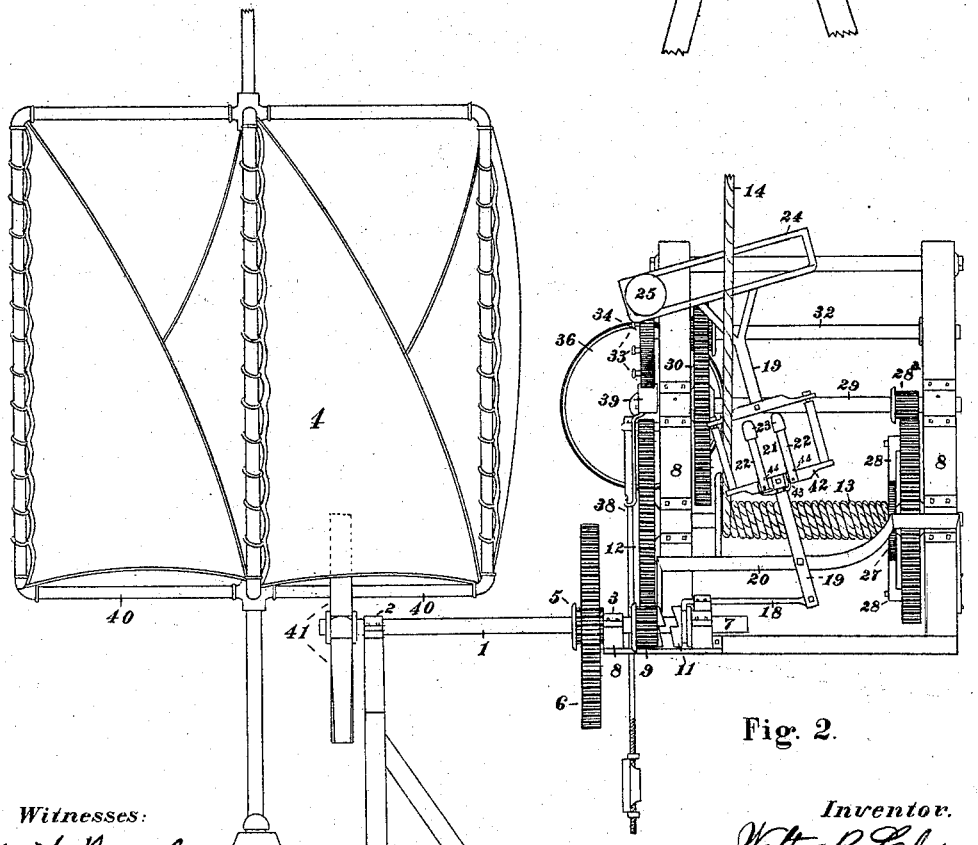
Figure 3:
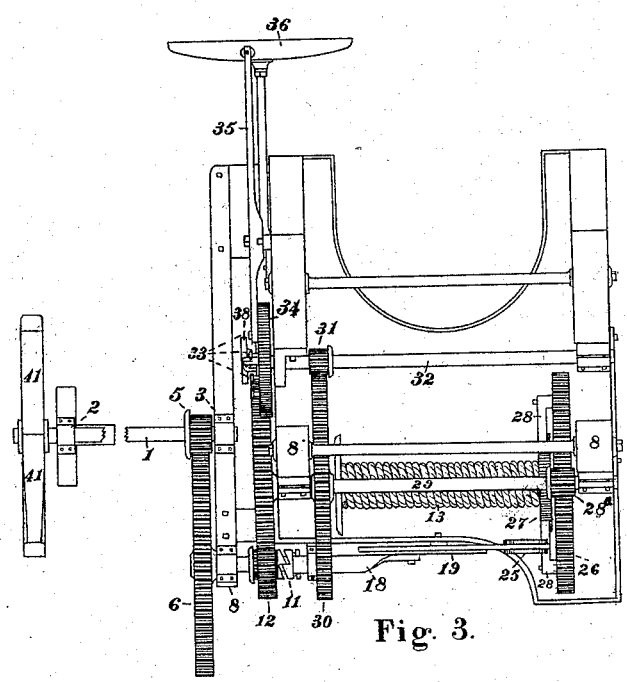
Figure 4:
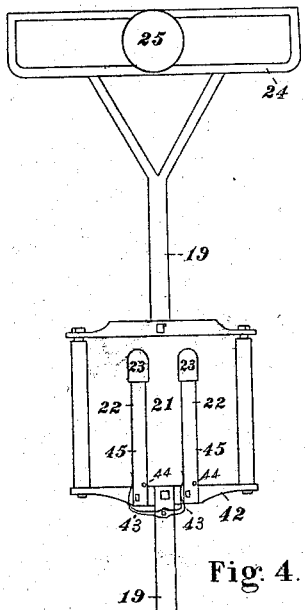
Figure 5:
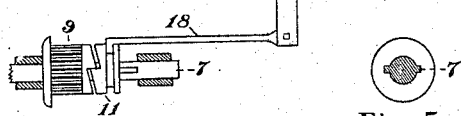
Figure 6:
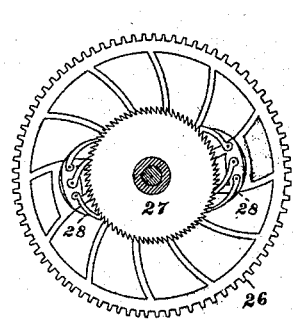
Figure 7:
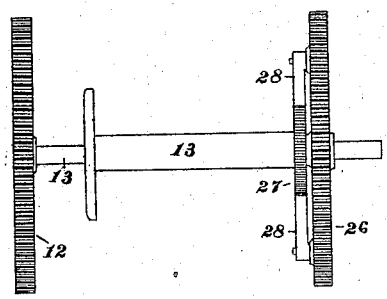
Figure 8:
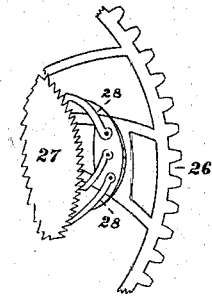

Figure 1 is a side elevation. Fig. 2 is a back view, with wind-engine attached. Fig. 3 is a plan. Fig. 4 is a front elevation of regulator, with automatic clutch. Fig. 5 is a cross-section of shaft 7, with spline-carrying adjustable clutch. Figs. 6, 7, and 8 are details.

Similar characters show like parts throughout the several figures.

My device is designed to be operated by wind power, (though other means may be employed, if desired,) and is shown in Fig. 2 connected with a wind-engine. I have preferred some form of wind-engine as the motive power for the reason that my device is of such construction as that when operated in this way it will continue working constantly without the care of an attendant. The main shaft 1, turning in suitable bearings, 2 3, is operated by the wind-engine 4, as shown in Fig. 2, or in any convenient manner; but in whatever way operated the power is applied to the shaft 1 through a sufficient number of radial arms 40, revolving preferably in the horizontal plane and operating upon radial arms 41, projecting from the main or driving shaft 1 at right angles to the radial arms 40. It carries a pinion, 5, arranged to mesh with the gear 6, turning on the shaft 7, having bearings in the frame 8 of my device. The shaft 7 carries the loose pinion 9, having a coupling-clutch formed to connect with the coupling-clutch 11, which slides longitudinally on said shaft, and is prevented from revolving thereon by a spline, as shown in Fig. 5. The clutch 11 is automatically operated, as hereinafter described. The loose pinion 9, being fixed by engagement with the clutch 11, meshes with and turns the gear-wheel 12, mounted upon and carrying the shaft or windlass 13, having suitable bearings in the frame 8. A rope or chain, 14, is secured by one end to the windlass and the other end carried to a sufficient height, and passing over a pulley, 15, pivoted in a frame, 16, is made fast to a heavy weight, 17.

By the construction thus far described it is apparent that the windlass is revolved and the weight lifted when the main shaft 1 is operated.

The adjustable clutch 11 is formed with an arm, 18, to which the regulator 19 (shown in Fig. 4) is pivoted, and the regulator or governor 19 is pivoted above its connection with the arm 18 to a cross-piece, 20, of the frame. The part of the regulator above the point at which it is pivoted to the cross-piece 20 branches, and in the space 21 between the two branches are upwardly-projecting spring-fingers 22, terminating in thimbles 23, arranged to revolve on the tips of the fingers. At the upper end of the regulator is a carriage, 24, fitted with a roller-weight, 25, traveling in said carriage. The fingers 22 are formed with spring-shanks 45 to admit of an outward bend, and are pivoted to the base of the branches of the regulator at 42, whereby lateral movement in one direction (as shown to the left) is permitted against springs 43, while lateral movement in the opposite direction is prevented by stops 44. The rope 14, wound spirally upon the windlass, passes through the space 21 between the branches of the regulator 19, and over the pulley 15, and as the windlass is operated the successive spirals of the rope traverse the length of the windlass. The rope itself then traverses the width of the space 21, or a portion of it. Starting from the position shown in Fig. 2, the clutch 11 being disconnected from its pinion 9, and the engine 4 not being in operation, but the windlass 13 unwinding by the force of the weight 17, the rope 14, in traveling across the space 21 from left to right, comes in contact with the left-hand one of the fingers 22, and continuing to bear thereon throws the regulator 19 over to the right and couples the clutch 11 with its pinion 9; but the engine 4 not being in operation the rope 14 continues in its course, passes both fingers 22, the springs 45 of which permit them to bend outward, and after arriving at the right-hand branch of the regulator turns back, and traveling from right to left and again passing the fingers 22, but this time without resistance, owing to the yielding of the springs 43, continues until it comes in contact with the left-hand branch of the regulator, which itself is then thrown over to the left and the clutch 11 again uncoupled from the pinion 9. The roller-weight 25 travels in its carriage as either end thereof is depressed by the tilting of the regulator and holds the regulator steady in position until the regulator is tilted back by the pressure of the rope 14. Starting from such position as that, the clutch 11 is coupled to its pinion 9, and the engine 4 being in operation the rope 14 is wound upon the windlass 13, and when sufficiently wound, so that the rope 14 traveling in the space 21 from right to left comes in contact with the left branch of the regulator 19, the regulator is tilted to the left, as shown, and the clutch 11 is uncoupled from its pinion 9. The winding on the windlass then ceases and the force of the weight commences to act to unwind the windlass.

To transmit the power developed by the action of the weight 17 exerted upon the windlass-shaft 13, I have adopted a species of clockwork, and the form used is thus described: Upon the rear end of the windlass or shaft 13 I mount a loose gear-wheel, 26, and a fixed ratchet-wheel, 27, so arranged, as shown in Figs. 6, 7, and 8, that as the windlass unwinds the loose gear-wheel 26 may be locked to the ratchet-wheel 27, and carried with it and the windlass 13 by means of the pawls 28, fixed upon the gear-wheel 26. As the windlass is wound up, then the gear-wheel 26 does not act; but when the windlass-shaft is unwound the gear-wheel 26 turns with it and operates the pinion 28ª upon the shaft 29, which also carries the gear-wheel 30. The gear-wheel 30 meshes with the pinion 31 upon the shaft 32, which also carries the escapement-wheel 34, the action of which is regulated by the spring-pendulum 38 and escapement 39.

When my device is used to operate a fog-signal, I secure upon the face of the escapement-wheel 34 any desired number of projecting spurs or trip-pins, 33. At a convenient point upon the frame, and so placed that its short arm may be struck and lowered by the trip-pins 33 as the escapement-wheel 34 revolves, I pivot the striker 35, and I secure to some part of the frame the bell or gong 36 in such position as to meet the striker when its long arm falls. The striker is raised from the gong after delivering its blow by the spring 37. To keep the pendulum 38 in motion and actuate the escapement 39 while the windlass 13 is being wound up, I have adopted the form of communicating the power of the engine 4 to the driving-shaft 1, (shown in Fig. 2,) viz: the radial arms 40 of the engine revolving in one plane and acting upon the radial arms 41 of the driving-shaft, revolving in a plane at a right angle to the first-named plane. The radial arms 41 of the driving-shaft 1 are so placed with reference to the radial arms 40 of the engine that when one of the arms 40 passes over one of the arms 41 the latter is released and the shaft 1 makes a partial revolution backward before the second of the arms 40 comes in contact with the second of the arms 41. The winding of the windlass being thus momentarily interrupted, the weight 17 acts, through the various gearings, upon the escapement-wheel 34, which, releasing the escapement 39, enables the pendulum 38 to operate to its full extent.

In operation, when the machine is set up, the rope should be partially wound upon the windlass, and assuming that no power is being applied to the shaft 1, or that the clutch 11 is uncoupled from its pinion 9—in other words, that the windlass is not being wound up—the force of the weight 17 acts to unwind the windlass, and, as hereinbefore described, causes the shaft 32, carrying the escapement-wheel 34, to revolve. If, on the contrary, power is applied to the shaft 1, (the clutch 11 being coupled to the pinion 9,) the windlass begins to wind; but as the rope 14 is wound upon the windlass, and traveling from right to left comes in contact with the left-hand branch of the regulator 19, it throws the top of the regulator to the left, as shown in Fig. 2, and the bottom of the regulator to the right, and moving the clutch 11 to the right and out of gear with the pinion 9, the pinion 9 no longer turns with its shaft, and no longer operates to wind up the windlass. The weight 17 then begins to act continuously, and the escapement-wheel and its shaft to revolve in like manner. The operation of the escapement-wheel, however, continues while the windlass is being wound, and is accomplished by the "backlash" of the shaft 1 in the intervals when one of the arms 40 is not acting upon the corresponding arm 41, as before explained. The operation of my device admits of its application to the driving of any kind of light machinery, power being taken from the shaft 32 by means of a fixed pulley. Among its advantages are the facts that the power may be accumulated much faster than it is expended, and the rope wound upon its windlass much more rapidly than it is unwound, that the winding and unwinding and the operation of the escapement-wheel are regulated automatically, and that attendance upon the machine is seldom required.

By varying the relative dimensions of the various pinions and gear-wheels, the size of the weight, or the adjustment of the pendulum-weight, the speed of the revolution of the shaft from which the power is transmitted may be regulated. When used as a fog signal, the number of strokes upon the bell in a given period of time may be established by simply using a greater or less number of trip-pins upon the face of the escapement-wheel. Different locations may thus be clearly pointed out and distinguished.

The radial arms 41 may be attached to a friction-clutch on the shaft 1, arranged to turn loose when the shaft 1 turns backward.

Having thus described my invention, what I claim, and desire to secure by Letters Patent, is—

1. An automatic device for coupling and uncoupling the winding-gear of a windlass, consisting of the combination of the windlass carrying a gear-wheel, a driving-shaft carrying a loose pinion arranged to mesh with said gear-wheel and having a coupling-clutch, a coupling-clutch arranged to slide longitudinally upon a spline on said shaft and to engage and disengage with the clutch on said pinion, a laterally-tilting regulator or governor pivoted near its lower end to the frame, having its lower extremity pivotally engaged with said sliding coupling-clutch by a connecting-rod and branching above the point at which it is pivoted to the frame, and the windlass-rope wound spirally upon said windlass and having its free end weighted after passing between the branches of the upper end of the regulator, substantially as described.

2. A windlass having a rope wound spirally thereon and weighted at its free end, driving-gear to wind said windlass, and automatic gear for disconnecting said driving-gear from said windlass, in combination with a fixed ratchet-wheel on the windlass-shaft, a loose gear-wheel, also on said windlass-shaft, carrying pawls arranged to act upon said ratchet-wheel when the windlass is being unwound, a clock-work connection between said gear-wheel, and a shaft from which the power may be transmitted, an escapement-wheel mounted upon said last-named shaft, and an escapement and spring-pendulum acting with said escapement-wheel, substantially as described.

3. In an automatic regulating device for transmitting power, the herein-described regulator for automatically coupling and uncoupling the winding-gear of a windlass operating by the action of the rope on said windlass in winding and unwinding thereon, said regulator consisting of an arm pivoted near its lower end to the frame, said arm having its lower end pivotally engaged to a coupling-clutch by a connecting-rod, its upper extremity above the point at which it is pivoted to the frame formed in two branches between which the windlass-rope passes, and having secured to the base of the branches in such manner as to allow lateral tilt in one direction only one or more upwardly-projecting fingers with spring-shanks, said fingers having revolving thimbles on their tips, substantially as described.

4. The herein-described automatic regulating device for transmitting power, consisting of the combination of a driving-shaft carrying a pinion meshing with a gear-wheel upon a second shaft carrying also a loose pinion having a coupling-clutch, a windlass carrying a gear-wheel meshing with said loose pinion, a rope wound spirally upon said windlass having one end secured to said windlass and the other (after passing over a pulley) to a weight, a clock-work connection (operating only when said windlass is being unwound) between said windlass and a shaft, whence the power is transmitted, an escapement-wheel mounted upon said last-named shaft, a spring-pendulum and an escapement working upon said escapement-wheel, a regulator so pivoted to the frame as to allow lateral tilt in either direction and to be tilted by the rope aforesaid passing therethrough when winding and unwinding upon said windlass, and a coupling-clutch sliding upon a spline upon said second shaft, adapted to couple with said loose pinion and actuated by said regulator, substantially as described.

5. The combination of a wind-engine, actuating radiating or turnstile revolving arms, with the herein-described automatic regulating device for transmitting power, consisting of a driving-shaft having radially-projecting turnstile-arms adapted to be engaged with and operated by the radial arms first named, said driving-shaft carrying a pinion meshing with a gear-wheel upon a second shaft carrying also a loose pinion having a coupling-clutch, a windlass carrying a gear-wheel meshing with said loose pinion, a rope wound spirally upon said windlass having one end secured to said windlass and the other (after passing over a pulley) to a weight, a clock-work connection (operating only when said windlass is being unwound) between said windlass and a shaft, whence the power is transmitted, an escapement-wheel mounted upon said last-named shaft, a spring-pendulum and an escapement acting upon said escapement-wheel, a regulator so pivoted to the frame as to allow lateral tilt in either direction and to be tilted by the rope aforesaid passing therethrough when winding and unwinding upon said windlass, and a coupling-clutch sliding upon a spline upon said second shaft, adapted to couple with said loose pinion and actuated by said regulator, substantially as described.

WALTER R. CLOSE.

Witnesses:
JOHN R. MASON,
CHAS. D. CROSBY.